(12) United States Patent
Torkildsen et al.

(10) Patent No.: US 6,284,024 B1
(45) Date of Patent: Sep. 4, 2001

(54) FLUID SEPARATION SYSTEM

(75) Inventors: Bernt H. Torkildsen, Bergen-Sandviken; Martin Sigmundstad, Hafrsfjord; Finn P. Nilsen, Nattland; Harald Linga, Nesttun, all of (NO)

(73) Assignee: Den norske stats oljeselskap a.s. (NO)

( * ) Notice: Subject to any disclaimer, the term of this patent is extended or adjusted under 35 U.S.C. 154(b) by 0 days.

(21) Appl. No.: 09/526,225

(22) Filed: Mar. 15, 2000

Related U.S. Application Data

(63) Continuation of application No. PCT/GB98/02777, filed on Sep. 14, 1998.

(30) Foreign Application Priority Data

| Sep. 15, 1997 | (GB) | 9719668 |
| Jan. 9, 1998 | (GB) | 9800480 |
| Jan. 9, 1998 | (GB) | 9800482 |

(51) Int. Cl.[7] .............................. B01D 47/10; B01D 53/14
(52) U.S. Cl. .................. 95/216; 95/235; 95/236; 96/323; 261/DIG. 54
(58) Field of Search .................... 95/216, 235, 236; 96/234, 266, 271, 272, 323; 261/DIG. 54

(56) References Cited

U.S. PATENT DOCUMENTS

| 3,912,469 | * | 10/1975 | Ewan et al. | 261/DIG. 54 |
| 3,970,740 | * | 7/1976 | Reeder et al. | 261/DIG. 54 |
| 4,293,524 | * | 10/1981 | Teller et al. | 261/DIG. 54 |
| 4,511,544 | * | 4/1985 | Connell et al. | 261/DIG. 54 |
| 4,603,035 | * | 7/1986 | Connell et al. | 261/DIG. 54 |
| 4,828,768 | * | 5/1989 | Talmor | 261/DIG. 54 |

FOREIGN PATENT DOCUMENTS

| 0379319 | 9/1996 | (EP) . |
| 90/13859 | 11/1990 | (WO) . |

* cited by examiner

Primary Examiner—Duane S. Smith
(74) Attorney, Agent, or Firm—Patterson, Thuente, Skaar & Christensen, P.A.

(57) ABSTRACT

The use of a turbulent contactor to absorb a selected gas component from a gas stream. The invention particularly applies to a method of removing selected gas components from a gas stream which includes: bringing the gas stream into contact with a liquid including a solvent or a reagent for the selected gas component in a turbulent contactor, the contactor including a gas inlet, a liquid inlet, an outlet leading to a venturi passage and a tube extending from the outlet back upstream, the tube being perforated and/or being spaced from the periphery of the outlet; subjecting the gas stream and liquid to turbulent conditions in the contactor thereby causing the gas component to be absorbed by the solvent or reagent.

19 Claims, 7 Drawing Sheets

FLUID SEPARATION SYSTEM

CROSS-REFERENCE TO RELATED APPLICATION

This is a Continuation of Application No. PCT/GB98/02777 filed Sept. 14, 1998.

FIELD OF THE INVENTION

The present invention relates to fluid separation systems. It is particularly concerned with the selective removal of a component or components from a mixture of gases using liquid solvent, for example it is concerned with the absorption of acid gases such as $CO_2$, $H_2S$, $NO_x$, oxides of sulphur etc. from natural gas and from combustion gases.

Conventional systems for the absorption of acid gases employ a liquid solvent; typical solvents include amines such as methyldiethanolamine (MDEA), monoethanolamine (MEA) or diethanolamine (DEA), and mixtures of solvents. These solvents absorb $CO_2$, $H_2S$, $NO_x$ and other acid gases. The solvent is contacted with the sour gas mixture (gas mixture including acid gases) in a column which may be a packed column, a plate column or a bubble-cap column, or a column with some other form of contact medium. In these systems, the gas and liquid streams flow countercurrently.

The prior art absorption systems suffer the disadvantage that in order to achieve a significant degree of gas/liquid contact, the columns have to be large and their operation is hampered by excessive foaming. In addition, the subsequent stripping section which removes the acid gas from solution must also be large, to handle the large volume of solvent used. Since the operation normally takes place under high pressure and the fluids involved are highly corrosive, the capital costs of the large columns and subsequent stripping section is high. Furthermore, operating costs and maintenance costs are high. It is an object of the present invention to provide a method of selectively absorbing a fluid component from a fluid mixture with a high degree of efficiency and more economically than in existing methods. In particular, it is an object of the present invention to provide a method of selectively removing a selected gas component from a gas stream with a high degree of efficiency.

BACKGROUND OF THE INVENTION

According to one aspect of the invention, there is provided a method of absorbing a selected gas component from a gas stream which comprises: bringing the gas stream into contact with a liquid including a solvent or a reagent for the selected gas component in a turbulent contactor, the contactor including a gas inlet, a liquid inlet, an outlet leading to a venturi passage and a tube extending from the outlet back upstream, the tube being perforated and/or being spaced from the periphery of the outlet; subjecting the gas stream and the liquid to turbulent mixing conditions in the contactor thereby causing the gas component to be absorbed by the solvent or reagent.

The invention also extends to the apparatus for carrying out this method.

The turbulent mixing is very intense and results in extremely efficient gas liquid contact. The mixing regime is preferably turbulent sheer layer mixing. The liquid entrained in the gas may be in the form of droplets for gas continuous fluid phase distribution The efficient mixing means that absorption can take place very rapidly and in a relatively small amount of solvent compared to that required in conventional absorption columns. This in turn means that the liquid duty in the equipment is dramatically reduced resulting in a consequential reduction in the size of any downs regeneration section. At the same time, the mixing system used is simple and inexpensive compared to prior art systems, leading to reduced costs. Finally, an efficiency of approaching 100% for the removal of the selected gas component (e.g. acid gas from natural gas or combustion gas) can be achieved, for certain applications.

In addition, conventional absorption methods involve the evolution of heat which must then be removed from the system While the method of the invention is capable of operation with a relatively low pressure drop across the mixing means, when a greater pressure drop is employed, a cooling effect is achieved and this may render the need for additional cooling unnecessary.

The absorption may be achieved by simply dissolving the gas component or by way of a chemical reaction with the solvent.

Preferably, the method is carried out as a continuous process with the gas stream and liquid flowing currently. The co-current flow eliminates the problems associated with foaming, since separation can easily be effected downstream of the mixer.

Preferably, the method further includes the step of separating a gas phase and a liquid phase after the turbulent mixing. Preferably, the liquid phase is subsequently treated to remove the absorbed gas component The turbulent mixing may be achieved by any convenient means, preferably in a turbulent contactor comprising a vessel having a gas inlet, a liquid inlet and an outlet leading to a venturi passage, and a tube extending from the outlet back into the vessel, the tube being perforated and/or being spaced from the periphery of the outlet. In one regime, the gas stream is supplied to the tube optionally directly and the liquid is supplied to the vessel, whereby the gas stream draws the liquid into the venturi and the two phases are mixed. In another regime, the gas stream is supplied to the vessel and the liquid is supplied to the tube optionally directly, whereby the gas stream is drawn into the venturi by low pressure generated by the flow through the venturi, and the two phases are mixed. Alternatively, the liquid and the gas stream are both supplied to the vessel, the liquid being supplied to a level above the level of the outlet, whereby the gas stream is forced out through the outlet via the tube, thereby drawing the liquid into the venturi so that the two phases are mixed.

The tube being spaced from the periphery of the outlet means that the phase passing via the tube draws the phase in the vessel at the outlet into the outlet via the space between the tube and the outlet Such a vessel is supplied by Framo Engineering A/S and is described in EP-B-379319. In the case where the tube is not spaced from the outlet, the tube is perforated and is arranged such that all the fluid which passes through the outlet does so by way of the tube.

It will be appreciated that the invention is applicable to any absorption application where the reaction kinetics are rapid, for example, the absorption of acid gas. The invention is also applicable to chemical reactions with fast reaction kinetics, where good mixing of the reactants is a requirement.

According to a more specific aspect of the invention, there is provided a method for removing a single selected component from a mixture of gases. Alternatively, the method extends to removing a plurality of gas components from a gas stream, either using a common solvent or reagent, or by respective solvents or reagents. According to a further aspect of the invention, the gas stream is a single gas which is absorbed.

Preferably, the gas stream and the liquid are formed into a homogeneous mixture in the contactor, the homogeneous mixture being cooled prior to separation into a gas phase and a liquid phase. Optionally, this phase separation occurs in a hydrocyclone.

Preferably, the solvent or reagent in the liquid phase is subjected to a regeneration treatment to remove the absorbed selected gas component. Preferably the regenerated solvent-containing liquid phase is recycled to the contactor.

Preferably, the regeneration is carried out by heating and/or by flashing off the absorbed gas component in a flash tank Preferably, the post mixing cooling and the regenerative heating are achieved at least in part by mutual heat exchange. Preferably, in instances where the gas stream is at a low pressure, the liquid is pumped to the vessel and thereby draws the gas stream with it through the vessel. Preferably, when the gas stream is at high pressures, it is conveyed to the vessel at a high pressure and thereby draws the liquid with it through the vessel.

The invention also extends to apparatus for carrying out such a method, comprising: a turbulent contactor having a liquid inlet, a gas inlet and a fluid outlet; a cooler for the fluid stream from the fluid outlet; a hydrocyclone arranged to separate the cooled fluid stream into a gas phase and a liquid stream; a regenerator arranged to treat the separated liquid steam; and a recycle line arranged to convey the regenerated liquid stream to the contactor.

The apparatus may include a pump arranged to supply liquid to the liquid inlet of the contactor. Preferably, the regenerator is a heater and/or a flash tank.

The invention may be considered to extend to the use of a turbulent contactor including a gas inlet, a liquid inlet, an outlet leading to a venturi passage and a tube extending from the outlet back upstream, the tube being perforated and/or being spaced from the periphery of the outlet for absorbing a selected gas component from a gas stream by bringing the gas stream into contact with a liquid including a solvent or a reagent for the selected gas component, thereby causing the gas component to be absorbed by the solvent or reagent.

Preferably, the tube is located in a vessel the vessel including the gas inlet, the liquid inlet and the outlet Suitable solvents for use in the method of the present invention include amines such as MDEA, MEA and DEA and mixtures of solvents. Also suitable as a solvent is seawater, although in this case it is not necessary to regenerate the solvent after it has passed through the contactor.

The separation/absorption/reaction systems described are single operations, however it will be appreciated that multi separation/absorption/reactions may be performed. These may be carried out simultaneously or sequentially and may also be carried out in series or in parallel.

It will be appreciated that the methods and the systems described above may be used to selectively remove one or more gas components from a gas stream. Selective absorption may be generated by adjustment of the residence time through the system. Since the rates of reaction for absorption of a variety of gases by a particular solvent will vary, it is possible to selectively absorb one gas in preference to another. An example of this is the selective absorption of $H_2S$ in an amine, which is virtually instantaneous, in preference to $CO_2$ which is absorbed slower.

The improved efficiency possible for the removal of, for example, acid gases makes the present invention particularly valuable as awareness is increased of the potential damage to the environment that can be caused by acid gases in effluents such as combustion gas.

Furthermore, the small size of the apparatus compared to conventional absorption columns render the invention especially applicable to use in marine applications, such as on board shuttle tankers.

The invention may be put into practice in various ways and two specific embodiments will be described by way of example to illustrate the invention with reference to the accompanying drawings, in which:

It will be appreciated that although the embodiments and examples refer to the removal of acid gases e.g. $CO_2$ from exhaust gas streams, the invention is not limited to this application. These embodiments and examples are illustrative and are not intended to be limiting.

Figure 1:
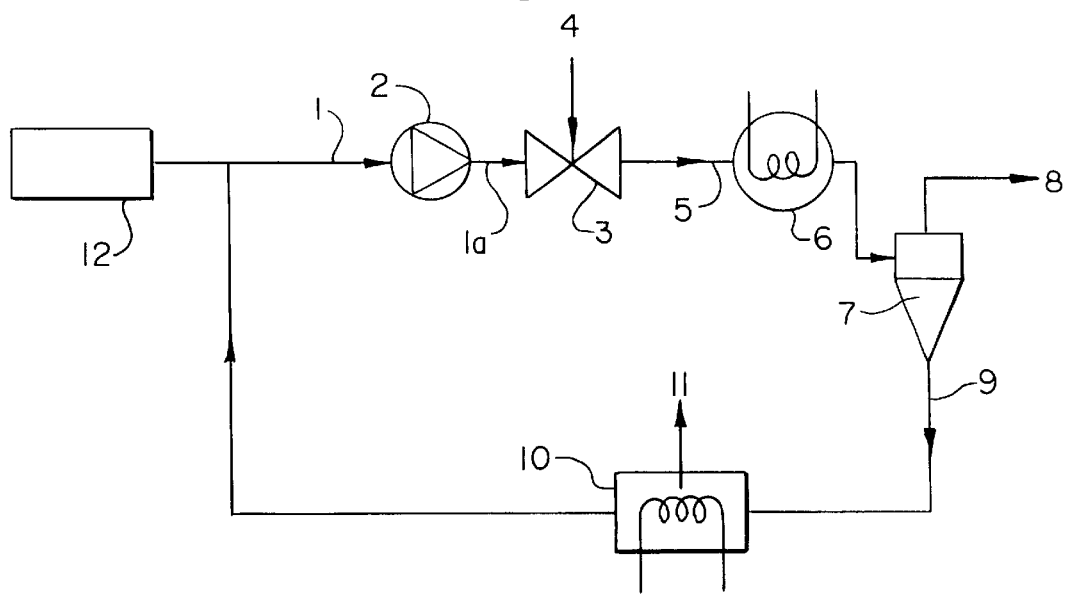
FIG. 1 is a flow diagram of the process for use when the gas is under low pressure.

In one embodiment of the invention, a continuous process operation for the removal of carbon dioxide (and other acid gases) from exhaust gas is shown in FIG. 1. A liquid solvent stream 1, for example HA (monoethanolamine), is conducted by a pump 2 to a contactor 3 capable of inducing turbulent mixing. An exhaust gas stream 4, including the $CO_2$ which is to be removed, is drawn into the contactor 3 by the low pressure generated in the venturi by the liquid steam after it has passed through the pump (stream 1a). This arrangement provides an automatic means of self-regulation as the gas mixture to solvent ratio can be maintained for varying flow rates. At the outlet of the contactor 3 the liquid solvent and the exhaust gas stream are in the form of a homogeneous mixture (stream 5) and the mass transfer of the $CO_2$ from the gas phase to the liquid occurs very rapidly.

The mixed two-phase stream 5 is then conveyed to a cooler 6 and on into a hydrocyclone 7. The gas stream 8 is taken off and the liquid stream 9 passes on to a regeneration system. At this point in the circuit all the $CO_2$ is in the liquid phase (stream 9) and the gas stream 8 is free of $CO_2$.

The regeneration of the liquid solvent is achieved by boiling off the $CO_2$ in a heater 10. The $CO_2$ is taken off as a gas stream 11 and the liquid solvent is optionally passed through a flash tank (not shown) to remove any residual dissolved gas before being recycled into the feed stream 1. The liquid solvent in stream 1 is topped up from the reservoir 12 as necessary to maintain a regular flow rate around the system.

It will be clear to a person skilled in the art that the cooler 6 and the heater 10 may be combined to form a heat exchange unit.

Figure 2:
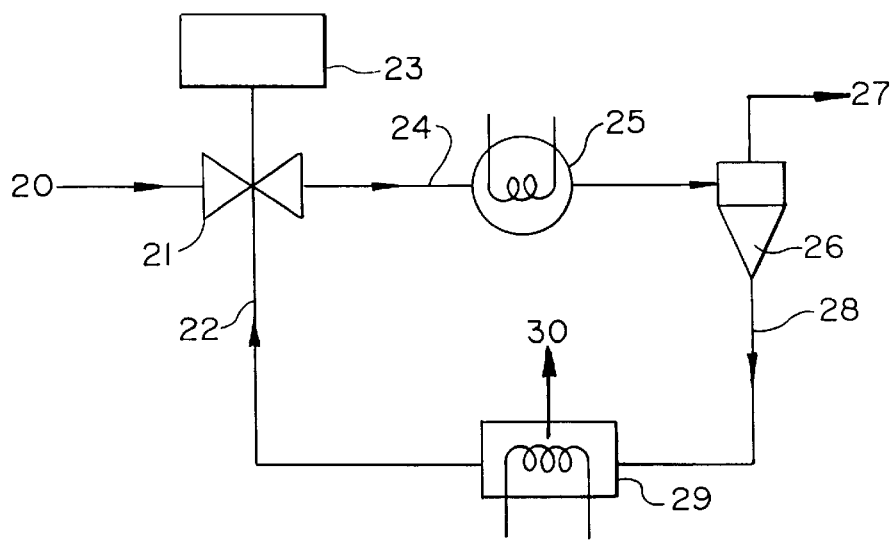
FIG. 2 is a flow diagram of the process for use when the gas is under high pressure.

An alternative system for the removal of $CO_2$ from a high-pressure gas stream is shown in FIG. 2. A high-pressure gas stream 20 containing the $CO_2$ which is to be removed is conveyed to a contactor 21. The high pressure of the gas draws a controlled amount of liquid solvent, for example MEA, from the recycle steam 22 and, if necessary, from a reservoir 23 into the contactor 21.

DETAILED DESCRIPTION OF THE INVENTION

At the outlet of the contactor 21 the two phases are in the form of a homogeneous mixture (steam 24) and the mass transfer of the $CO_2$ from the gas phase to the liquid solvent takes place The residence time may be as little as 0.1 seconds since, for example, the reaction kinetics for the absorption of $CO_2$ by MEA are very rapid, although this residence time will vary with the solvent used and the gas to be transferred from the gas stream to the liquid.

Figure 3:
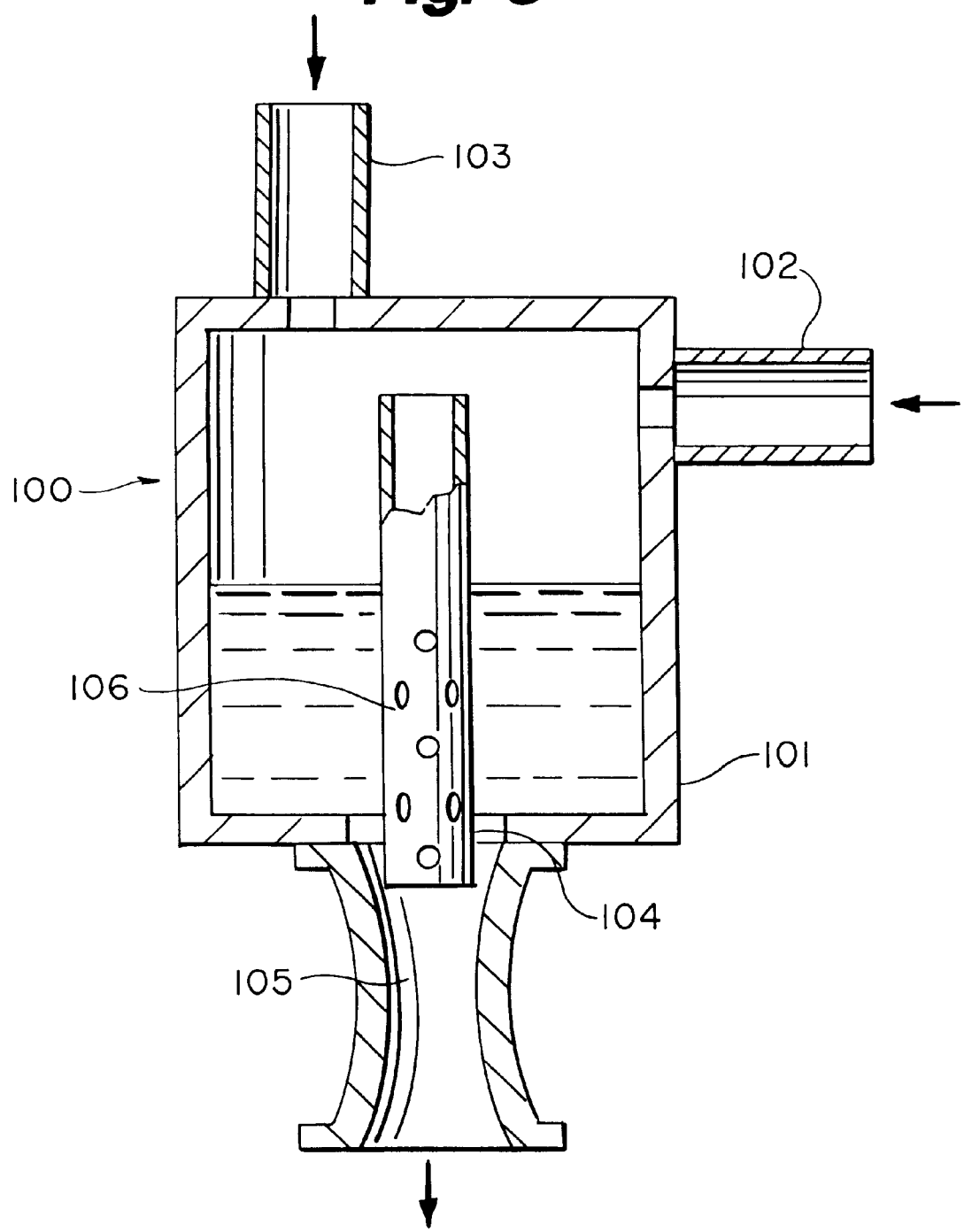
FIG. 3 is a view of the contactor suitable for use in the method of the present invention and as used in the batch test procedure.

The two-phase mix (stream 24) passes through a cooler 25 to a hydrocyclone unit 26. The gas stream free of $CO_2$ is taken off in stream 27 and the remaining liquid stream 28 including the $CO_2$ is passed to a regeneration system The liquid stream 28 is fed into a heater 29 to remove the $CO_2$ as a gas stream 30. This regenerates the solvent for re-use in the system. This solvent (stream 22) is then drawn into the contactor 21 by the low pressure generated in the venturi by the high-pressure gas (stream 20) as explained above. Any shortfall in the solvent liquid is made up by addition from the reservoir 23. As in the first embodiment, the heater 29 and the cooler 25 can be combined to form a heat exchange unit One example of a contactor which may be used in both the above embodiments is that shown in FIG. 3. The turbulent contactor 100 comprises a vessel 101 having a first fluid inlet 102, a second fluid inlet 103 and an outlet 104 leading to a venturi passage 105. There is a tube 106 (which may or may not be perforated) extending from the outlet 104 back into the vessel 101.

In a first arrangement, the gas mixture is supplied to the vessel 101 and the liquid is supplied to the tube 106 optionally directly whereby the gas is drawn into the venturi by the liquid and the two phases are mixed.

In a second arrangement, the liquid is supplied to the vessel 101 and the gas mixture is supplied to the tube 106 optionally directly whereby the liquid is drawn into the venturi by the gas and the two phases are mixed.

In a third arrangement, the liquid and the gas mixture are supplied to the vessel 101, the liquid being supplied to a level above the level of the outlet 104, whereby the gas is forced out through the outlet 104 via the tube 106, thereby drawing the liquid into the venturi so that the two phases are mixed.

Figure 4:
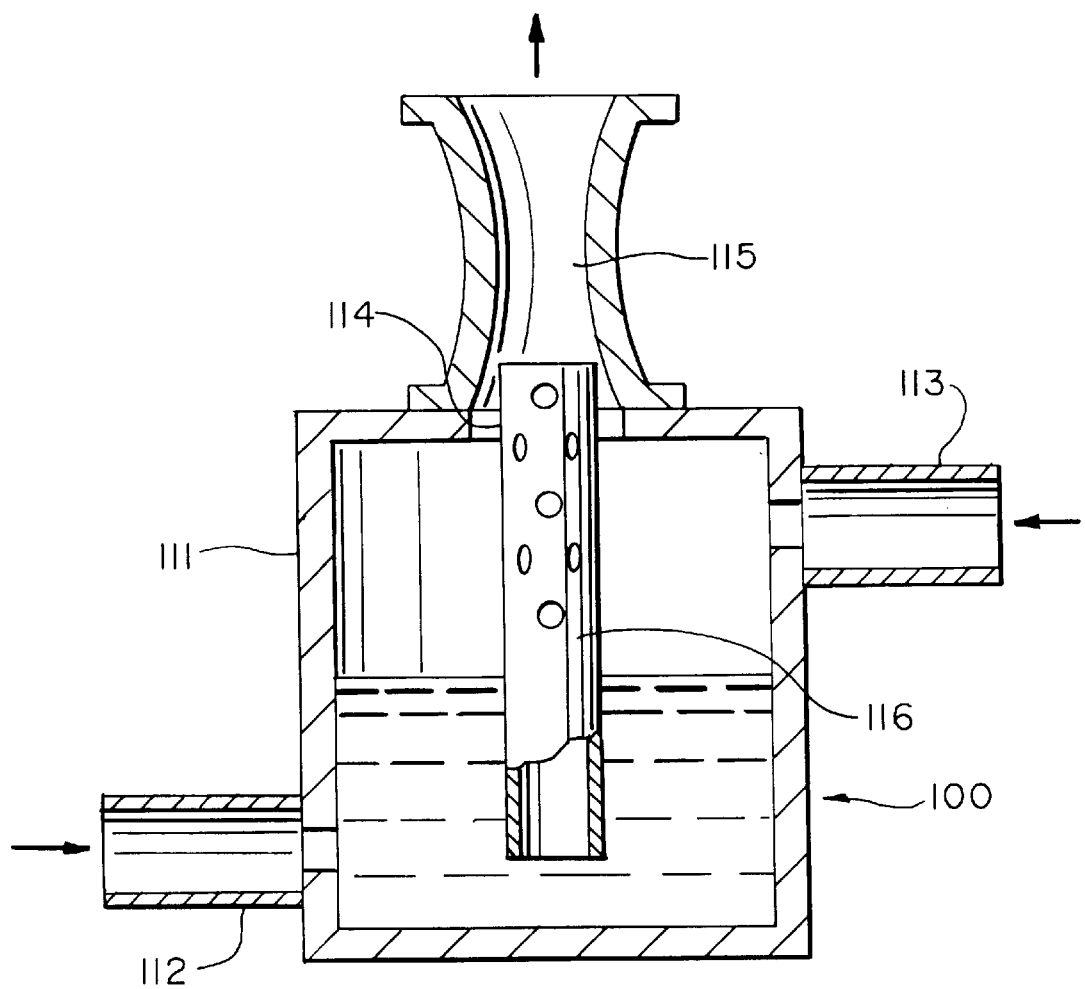
FIG. 4 is a variant of the contactor shown in FIG. 3.

A fourth variant is shown in FIG. 4. This embodiment is similar to that shown in FIG. 3, but the contactor 110 is inverted. It comprises a vessel 111 with a liquid inlet 112, a gas inlet 113 and an outlet 114 leading to a venturi passage 115. There is a tube 116 (which may or may not be perforated) extending from the outlet 114 back into the vessel 111. The tube 116 may be connected directly to the gas inlet 113.

In this embodiment the liquid is forced up the tube 116 and the gas is drawn into the venturi passage 115 by the liquid and the two phases are mixed. When the tube 116 is perforated, the gas may be drawn into the tube 116 through the perforations.

Figure 5:
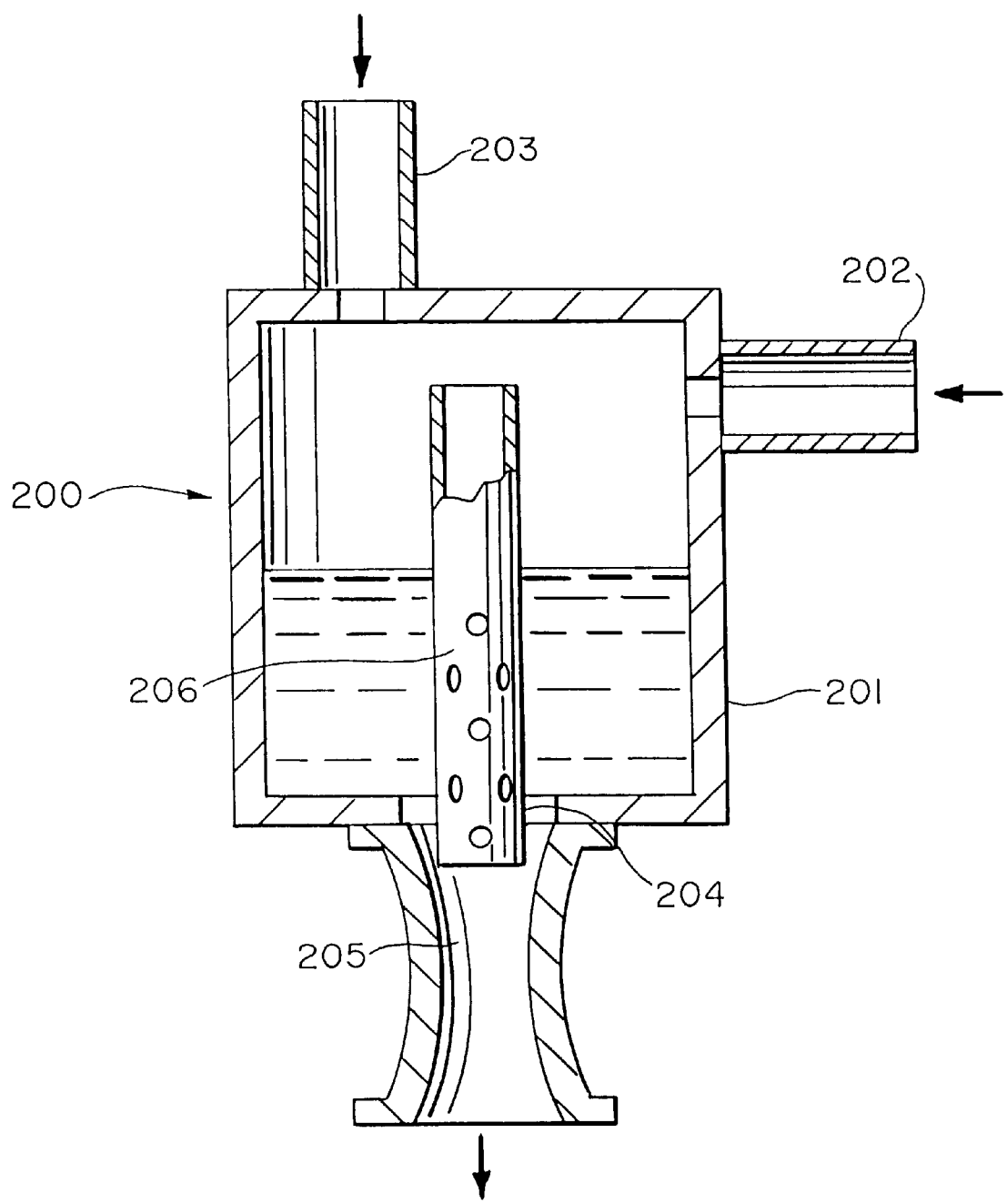
FIG. 5 is a view of a contactor similar to that shown in FIG. 3 but with the perforated tube arranged so that all the fluid which passes through the outlet does so by way of the tube.

A further example of a contactor which may be used in both the above embodiments is that shown in FIG. 5. The turbulent contactor 200 comprises a vessel 201 having a first fluid inlet 202, a second fluid inlet 203 and an outlet 204 leading to a venturi passage 205. There is a perforated tube 206 extending from the outlet 204 back into the vessel 201. The perforated tube 206 is arranged such that there is no gap at the outlet 204 of the vessel 201 for the fluids to pass through The result of this arrangement is that all the fluid exits the vessel 201 via the perforated tube 206.

In a first arrangement, the gas mixture is supplied to the vessel 201 and the liquid is supplied to the tube 206 optionally directly whereby the gas is drawn into the venturi by the liquid and the two phases are mixed.

In a second arrangement, the liquid is supplied to the vessel 201 and the gas mixture is supplied to the tube 206 optionally directly whereby the liquid is drawn into the venturi by the gas and the two phases are mixed.

In a third arrangement, the liquid and the gas mixture are supplied to the vessel 201, the liquid being supplied to a level above the level of the outlet 204, whereby the gas is forced out through the outlet 204 via the tube 206, thereby drawing the liquid into the venturi so that the two phases are mixed.

Figure 6:
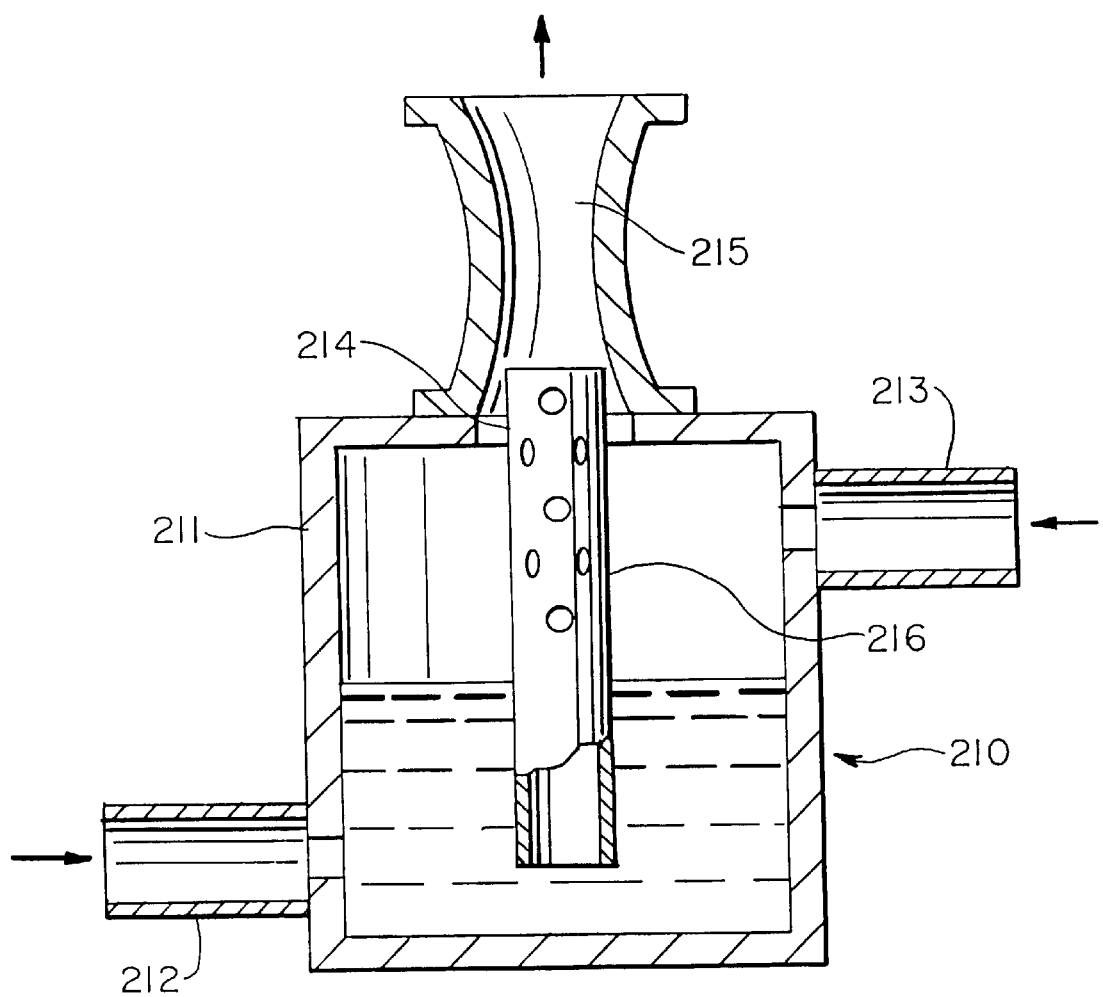
FIG. 6 is a variant of the contactor shown in FIG. 5.

A fourth variant is shown in FIG. 6. This embodiment is similar to that shown in FIG. 5, but the contactor 210 is inverted. It comprises a vessel 211 with a liquid inlet 212, a gas inlet 213 and an outlet 214 leading to a venturi passage 215. There is a perforated tube 216 extending from the outlet 214 back into the vessel 211. As for the embodiment shown in FIG. 5, the perforated tube 216 is arranged such that there is no gap at the outlet 214 of the vessel 211 for the gas mixture to pass through. All the fluids must pass through the perforated tube 216 to the venturi passage 215.

In this embodiment the liquid is forced up the tube 216 and the gas is drawn into the venturi passage 215 by the liquid and the two phases are mixed. Since the tube 216 is perforated, the gas is drawn into the tube 216 through the perforations.

The invention is further illustrated by reference to the following examples. These serve to verify the operating principles of the two embodiments described. In the first series of batch experiments conducted, the gas stream was a mixture of nitrogen ($N_2$) and $CO_2$ and the liquid solvent was a mixture of MEA and water. The reservoir pipe was kept under pressure using nitrogen gas. The contactor used was a Framo contactor generally as described in EP 379319 and shown in FIG. 3. The contactor injection pipe was adjusted to yield gas/liquid ratios in the range of about 3 to 5, depending upon the total flow rate.

Figure 7:
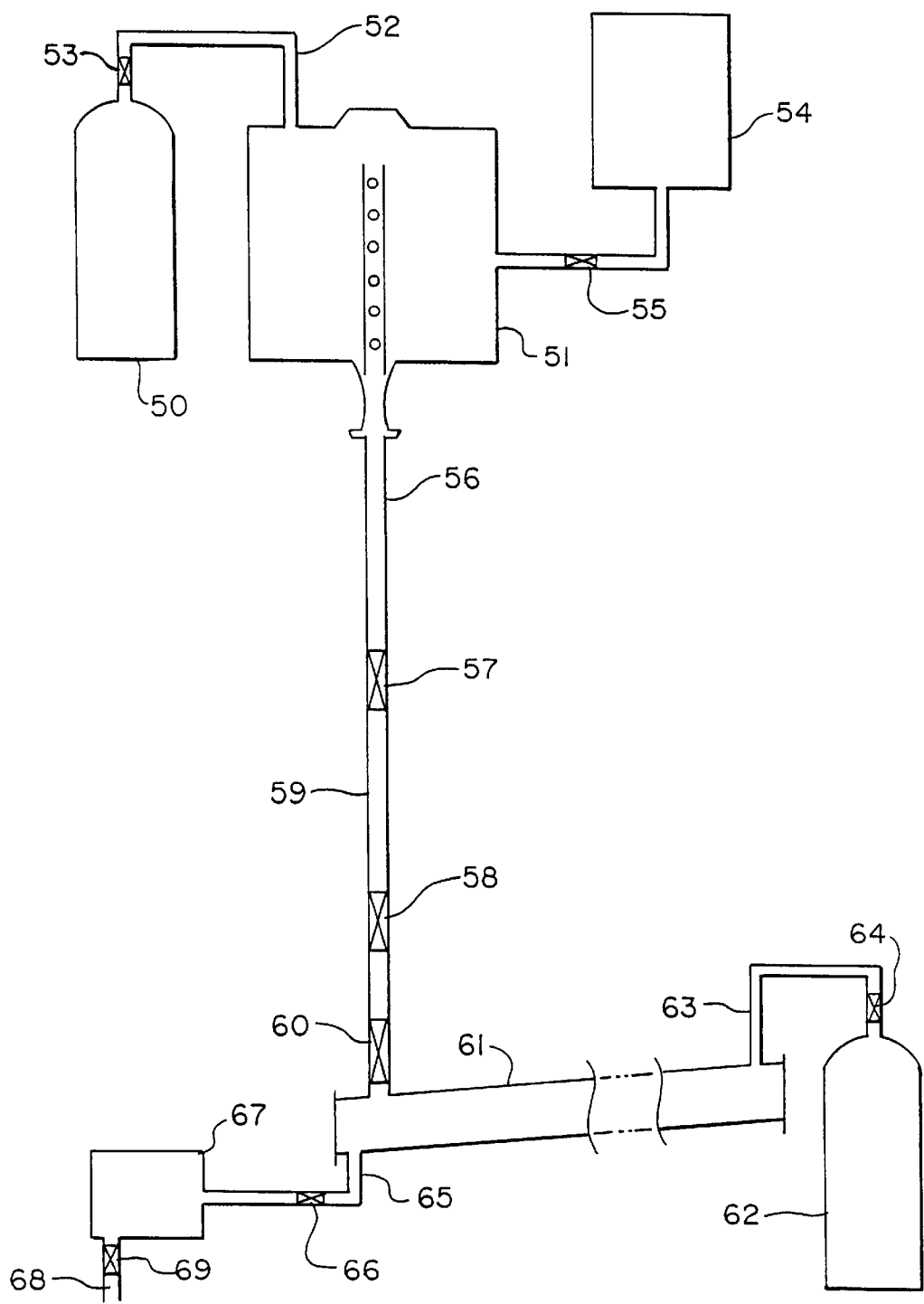
FIG. 7 is a block diagram of the apparatus as used in the batch test procedure for a mixture of $N_2$ and $CO_2$ as test gas.

A schematic diagram for the first series of experiments is shown in FIG. 7. The contactor 51 is charged with an amount of the liquid solvent mixture from the reservoir 54 which is controlled by a valve 55. A gas source 50 of the experimental $N/CO_2$ gas mixture is conveyed to the contactor 51 via a pipe 52 controlled by a valve 53.

At the outlet of the contactor 51 there is a 1 meter section of pipe 56 in which the mass transfer occurs. This section provides the residence time for the contacting materials. A set of 2 simultaneously acting fast closing valves 57 and 58 form a 1.5 meter analysis section 59 where the gas/liquid mixture can be captured, separated and sampled. At the top end of the analysis section there is a sampling point where a sample of the gas can be drawn off(not shown). At the lower end of the section there is a further sampling point where a sample of the liquid can be drawn off (not shown). The lower section of the sampling section is provided with means for cooling the liquid sample prior to its removal (not shown for clarity).

A further valve 60 separates the sampling section from a reservoir pipe 61 and is used to control the flow rate through the system. The reservoir pipe 61 is pressurized to a predetermined pressure by an independent nitrogen gas source 62 via a pipe 63 controlled by a valve 64. This pressure will be lower than that in the contactor to provide a pressure difference which will force the fluids through the system. The reservoir pipe 61 is inclined with respect to the horizontal to enable the liquid collected to be drained off via a pipe 65 controlled by a valve 66 to a measurement drum 67 which is used to determine the amount of liquid passing through the system on each run. The drum 67 has a drainage pipe 68 controlled by a valve 69.

In operation, the contactor 51, pipe section 56 and analysis section 59 are filled with the suitable strength solvent solution. The simultaneously acting valves 57 and 58 are closed and valve 60 is set to a position carefully adjusted to yield the required mass flow rate through the system for the predetermined pressure difference between the mixer and the reservoir pipe.

In the first set of experiments, the contactor 51 is pressurised with the test gas of $CO_2$-rich nitrogen to a pressure of 50 barg. The reservoir pipe 61 is pressurised with nitrogen to a predetermined value typically between 16 and 48 barg, providing a range of flow rates through the system.

Before the experiment starts, a sample of the test gas is taken to determine the level of $CO_2$ in the gas. The experiment commences with the activation of the simultaneously operating valves 57 and 58. The liquid and the gaseous solution flow co-currently through the system to the reservoir pipe 61. The pressure in the contactor is maintained at 50 barg during the 10 second test run by manual supply of the test gas from a cylinder fitted with an accurate manometer. This makes it possible to record the amount of spent gas for each experiment After 10 seconds the 2 operating valves 57 and 58 are closed simultaneously. A sample of gas from the analysis section is extracted from the upper sampling point immediately after the valves have closed. This is then tested for content of $CO_2$ by gas chromatography. The machine used was a Chromopack Model CP-2002 gas chromatograph In order to verify the mass balance, a liquid sample of the amine solution in the analysis section is taken from the lower sampling point Before the sample is taken the liquid in the analysis section is cooled using nitrogen gas surrounding the pipe section 59. The liquid sample is analysed using a titration technique specially developed for $CO_2$.

At the end of each run, the liquid from the reservoir pipe 61 is released into the measurement drum 67 to measure the amount of liquid expended in the course of the run The results of the tests are shown in Table 1 below:

TABLE 1

| MEA wt % | mol % $CO_2$ in exit gas | gas flow rate (m³/hr) | liquid flow rate (m³/hr) | total flow rate (m³/hr) | gas volume fraction |
|---|---|---|---|---|---|
| 50 | 0.005 | 10.34 | 4.63 | 14.97 | 0.69 |
| 50 | 0.003 | 11.76 | 3.92 | 15.68 | 0.75 |
| 50 | 0.005 | 12.12 | 3.92 | 16.04 | 0.76 |
| 50 | 0.002 | 10.87 | 3.92 | 14.79 | 0.73 |
| 50 | 0.006 | 10.08 | 3.96 | 14.04 | 0.72 |
| 50 | 0.007 | 11.7 | 3.6 | 15.3 | 0.76 |
| 50 | 0.019 | 10.44 | 3.24 | 13.68 | 0.76 |
| 50 | 0.006 | 7.2 | 3.24 | 10.44 | 0.69 |
| 50 | 0.007 | 15.48 | 3.24 | 18.72 | 0.83 |

TABLE 1-continued

| MEA wt % | mol % $CO_2$ in exit gas | gas flow rate (m³/hr) | liquid flow rate (m³/hr) | total flow rate (m³/hr) | gas volume fraction |
|---|---|---|---|---|---|
| 25 | 0.009 | 10.08 | 4.68 | 14.76 | 0.68 |
| 25 | 0.005 | 9 | 3.96 | 12.96 | 0.69 |
| 25 | 0.006 | 9 | 3.96 | 12.96 | 0.69 |
| 25 | 0.003 | 6.84 | 3.6 | 10.44 | 0.66 |
| 25 | 0.005 | 14.04 | 4.32 | 18.36 | 0.76 |
| 5 | 2.03 | 14.4 | 3.6 | 18 | 0.80 |
| 5 | 0.5 | 15.12 | 3.24 | 18.36 | 0.82 |
| 5 | 2.95 | 17.28 | 3.24 | 20.52 | 0.84 |
| 5 | 3.65 | 18.72 | 1.8 | 20.56 | 0.91 |
| 5 | 1.63 | 12.6 | 3.96 | 16.56 | 0.76 |
| 5 | 2 | 14.76 | 3.96 | 18.72 | 0.79 |
| 5 | 2.13 | 15.84 | 3.6 | 19.44 | 0.81 |
| 5 | 0.31 | 7.92 | 3.6 | 11.52 | 0.69 |
| 5 | 1.25 | 7.92 | 3.6 | 11.52 | 0.69 |
| 5 | 2.32 | 10.44 | 3.6 | 14.04 | 0.74 |
| 5 | 2.67 | 11.16 | 3.6 | 14.76 | 0.76 |
| 5 | 3.4 | 18 | 3.6 | 21.6 | 0.83 |

In all cases the gas feed composition was 10.5 mol per cent $CO_2$ in nitrogen.

The results show that virtually all the $CO_2$ is absorbed from the gas to liquid solvent for the 50% and 25% mixture for all the flow rates tested. Only on reduction of the MEA concentration to a mere 55 by weight does the amount of $CO_2$ remaining in the gas reach appreciable levels.

From the measurement at the 5% level, it can be seen that the absorption efficiency decreases with an increasing gas flow rate and gas volume fraction. This result is expected since the already lean solvent mixture (only 5% MEA) has a diminishing capacity to absorb all of the $CO_2$.

The gas chromatograph measurements of the $CO_2$ were verified using the data obtained from the titration of the liquid sample. A mass balance calculation on the $CO_2$ through the system showed that the $CO_2$ which was in the test gas had been transferred to the liquid.

In a second set of experiments, the contactor 51 was only pressurized to a low pressure (in the range 0.5 to 2 barg) and the reservoir pope 61 was left open to atmospheric pressure. This gave a driving force of between 0.5 and 2 bar. The only change to the apparatus from the first set of experiments is the addition of a small hydrocyclone at the top of the gas pipe to separate the gas and liquid after reaction. This means that there are no entrained droplets in the gas sample. In these experiments, the liquid solvent mixture is a 50% solution of MEA and the gas feed composition was 9.4 mol per cent $CO_2$ in nitrogen. As for the first set of experiments, the test run lasted for 10 seconds and the pressure in the contractor was maintained by manual supply of the test gas. The results are shown in table 2 below.

TABLE 2

| Contractor P (barg) | mol % $CO_2$ in exit gas | gas flow rate (m³/hr) | liquid flow rate (m³/hr) | total flow rate (m³/hr) | gas volume fraction |
|---|---|---|---|---|---|
| 0.5 | 0.59 | 2.16 | 4.68 | 6.84 | 0.316 |
| 0.5 | 0.87 | 1.80 | 4.32 | 6.12 | 0.294 |
| 0.5 | 0.80 | 2.16 | 3.96 | 6.12 | 0.353 |
| 1 | 0.80 | 3.24 | 4.68 | 7.92 | 0.409 |
| 1 | 0.95 | 3.24 | 4.32 | 7.56 | 0.429 |

TABLE 2-continued

| Contractor P (barg) | mol % $CO_2$ in exit gas | gas flow rate (m³/hr) | liquid flow rate (m³/hr) | total flow rate (m³/hr) | gas volume fraction |
|---|---|---|---|---|---|
| 1 | 1.20 | 3.42 | 4.32 | 7.74 | 0.442 |
| 1.5 | 1.10 | 4.68 | 4.32 | 9.00 | 0.520 |
| 1.5 | 0.76 | 4.68 | 4.14 | 8.82 | 0.531 |
| 1.5 | 1.27 | 5.04 | 4.32 | 9.36 | 0.538 |
| 2 | 0.73 | 6.12 | 5.22 | 11.34 | 0.540 |
| 2 | 1.10 | 6.48 | 5.76 | 12.24 | 0.529 |
| 2 | 0.82 | 6.12 | 5.40 | 11.52 | 0.531 |
| 0.5 | 0.13 | 2.52 | 3.96 | 6.48 | 0.389 |
| 0.5 | 0.61 | 3.60 | 3.96 | 7.56 | 0.476 |
| 0.5[1] | 0.45 | 2.16 | 3.69 | 5.85 | 0.369 |

(1)—this experiment had a run time of 20 seconds.

The small pressure difference driving the fluids through the system results in there being more liquid relative to the gas than in the previous experiments. Even at these lower gas volume fractions, most of the carbon dioxide is removed from the gas phase. It will be noted that there is no real trend from a pressure difference of 0.5 to 2.0 bar so it will be apparent that this method is applicable down to lower pressure differences than 0.5 bar. Such pressure differences may be present, for example, in exhaust gas systems.

Figure 8:
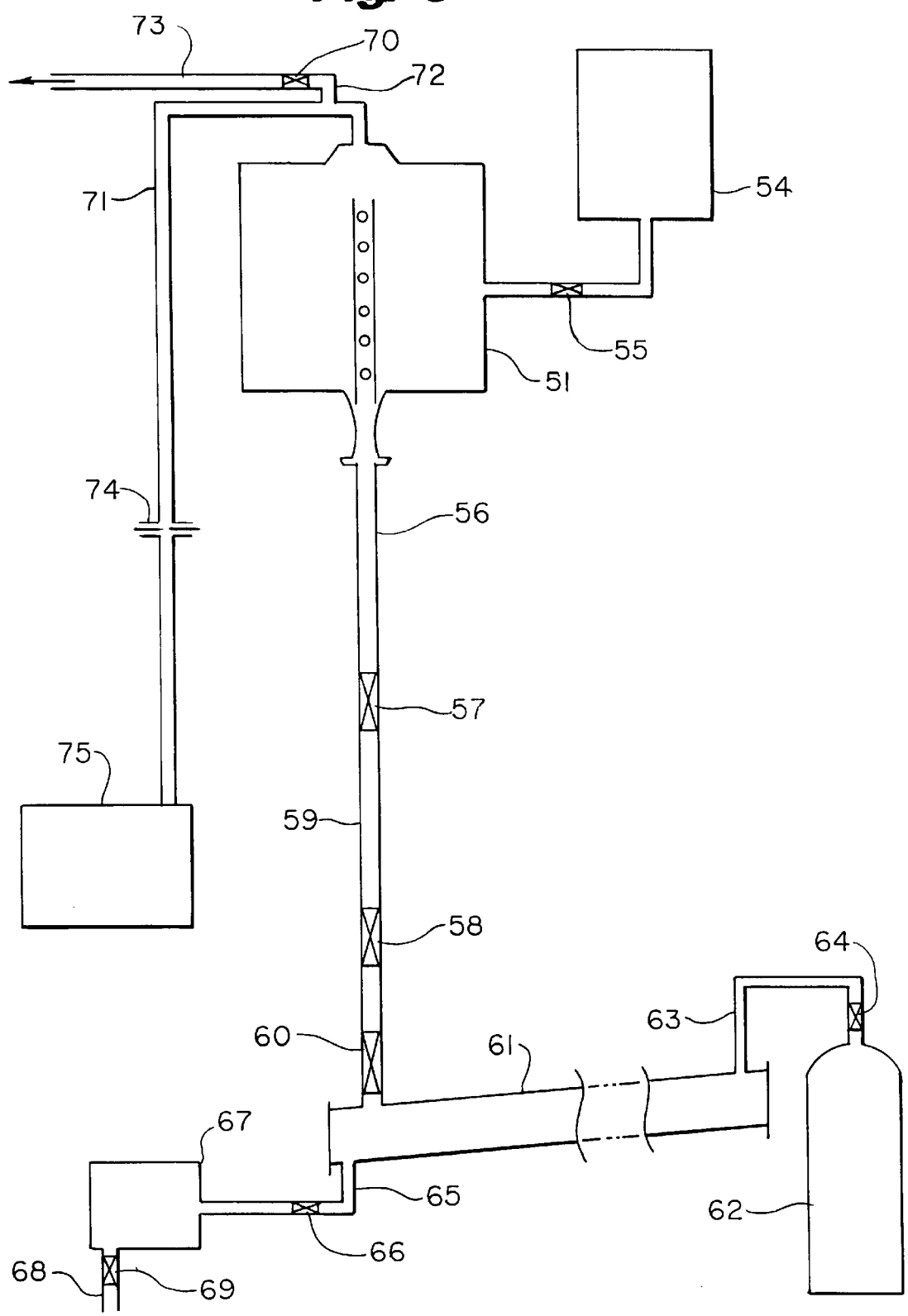
FIG. 8 is a block diagram of the apparatus as used in the batch test procedure using exhaust gas as the test gas.

In a third set of experiments, exhaust gas was used in place of the experimental $N_2/CO_2$ mixture. A schematic diagram of the apparatus for these experiments is shown in FIG. 8 In general, the system is operated in a similar way to the system shown in FIG. 7. As for the first set of experiments, the contactor 51, pipe section 56 and analysis section 59 are charged with an amount of the liquid solvent mixture from the reservoir 54. The exhaust gas comes from a diesel engine 75 and passes through the contactor with a minimum loss of temperature. In contrast to the earlier experiments, the contactor 51 is not pressurised.

In these experiments, the gas mixture is exhaust gas from a Yannmar 4TN84E 15 KVA water-cooled diesel engine 75. A 30% load was placed on the diesel engine to increase the exhaust gas temperature and to obtain a higher level of $CO_2$ in the exhaust gas. An orifice plate 74 is provided in pipe 71 for continuous flow measurement of the exhaust gas.

Before the experiment starts, a sample of the exhaust gas is taken at point 72 to measure the $CO_2$ content in the exhaust gas exhausting from pipe 73. In operation, the valve 70 is closed, allowing exhaust gas to enter the contactor 51. When a pressure of approximately 0.4 barg has built up in the contactor, the two valves 57 and 58 are opened simultaneously. As in the previous experiments, the liquid and the gaseous solution flow co-currently through the system for 10 seconds into the reservoir pipe 61 before the valves 57 and 58 are closed simultaneously.

A sample of gas from the analysis section 59 is extracted from the upper sampling point immediately after the valves are closed. As before, the sample is tested for content of $CO_2$ by gas chromatography using a Chromopack Model Cp-2002. At the end of each run the expended liquid is released from the reservoir pipe 61 to the measurement drum 67 and weighed. In theses experiments, the liquid solvent mixture is a 50% solution of MEA. The results for these test are shown in Table 3 below:

TABLE 3

| $C_1$ | T | S | $C_2$ | $Q_G$ | $Q_L$ | $Q_T$ | G/L |
|---|---|---|---|---|---|---|---|
| 1.4 | 30 | 15 | 0.03 | 45 | 5.40 | 50.40 | 8.33 |
| 1.4 | 30 | 15 | 0.04 | 45 | 5.40 | 50.40 | 8.33 |
| 1.4 | 30 | 14 | 0.06 | 45 | 5.04 | 50.04 | 8.93 |
| 4 | 50 | 14 | 0.19 | 45 | 5.04 | 50.04 | 8.93 |
| 4 | 50 | 16 | 0.15 | 45 | 5.76 | 50.76 | 7.81 |
| 4 | 50 | 14 | 0.09 | 45 | 5.04 | 50.04 | 8.93 |
| 4 | 50 | 14 | 0.08 | 45 | 5.04 | 50.04 | 8.93 |
| 4 | 50 | 13 | 0.10 | 45 | 4.68 | 49.68 | 9.62 |
| 15.5 | 65 | 12 | 0.10 | 45 | 4.32 | 49.32 | 10.42 |
| 15.5 | 65 | 15 | 0.10 | 45 | 5.40 | 50.40 | 8.33 |
| 15.5 | 65 | 16 | 1.40 | 45 | 5.76 | 50.76 | 7.81 |
| 15.5 | 65 | 15 | 1.00 | 45 | 5.40 | 50.40 | 8.33 |
| 15.5 | 65 | 14 | 0.20 | 45 | 5.04 | 50.04 | 8.93 |
| 2.8 | 122 | 15 | 0.22 | 59 | 5.40 | 64.40 | 10.93 |
| 2.8 | 133 | 15 | 0.07 | 59 | 5.40 | 64.40 | 10.93 |
| 2.8 | 128 | 15 | 0.06 | 59 | 5.40 | 64.40 | 10.93 |
| 2.8 | 132 | 14 | 0.06 | 59 | 5.04 | 64.04 | 11.71 |
| 2.2 | 136 | 15 | 0.10 | 59 | 5.40 | 64.40 | 10.93 |
| 2.2 | 133 | 14 | 0.30 | 59 | 5.04 | 64.04 | 11.71 |
| 3.4 | 123 | 5.5 | 0.37 | 59 | 1.98 | 60.98 | 29.80 |
| 3.4 | 123 | 6.5 | 0.25 | 59 | 2.34 | 61.34 | 25.21 |
| 3.4 | 123 | 6.5 | 0.10 | 59 | 2.34 | 61.34 | 25.21 |
| 3.4 | 123 | 6.5 | 0.27 | 59 | 2.34 | 61.34 | 25.21 |
| 3.4 | 123 | 6 | 0.27 | 59 | 2.16 | 61.16 | 27.31 |
| 9.98 | 118 | 7 | 0.22 | 59 | 2.52 | 61.52 | 23.41 |
| 9.98 | 118 | 7 | 0.01 | 59 | 2.52 | 61.52 | 23.41 |
| 9.98 | 118 | 6.5 | 0.01 | 59 | 2.34 | 61.34 | 25.21 |

Key to Table 3:
$C_1$ - mol % $CO_2$ in exhaust gas
T - Temperature of the exhaust gas (° C.)
S - Expended solvent (1)
$C_2$ - mol % $CO_2$ in exit gas
$Q_G$ - gas flow rate (m³/hr)
$Q_L$ - liquid flow rate (m³/hr)
$Q_T$ - total flow rate (m³/hr)
G/L - gas/liquid ratio As can be seen from the above results, virtually all the $CO_2$ is removed from the gas and absorbed into the liquid solvent. It is also clear that the removal efficiency is higher for higher concentrations of $CO_2$ in the feed gas which is significant for gas turbine applications. However, the efficiency of the system is still high for low concentrations of $CO_2$ in the feed gas. It is noted that there is no significant trend when the temperature of the exhaust gas is varied. This is probably because there is a "quenching effect" when the cool solvent solution contacts the exhaust gas. Reducing the amine flow rate does not significantly change the removal efficiency indicating that the system can be operated with higher gas/liquid ratios, for example higher than 30.

It will apparent to a person skilled in the art that the results from the three sets of experiments above are not dependant upon the gas to be absorbed or on the solvent used to absorb that gas. Therefore it is clear that the above method of selective transfer of a gas from a mixture of gases to a liquid solvent for that gas is applicable to any gas and any respective solvent.

What is claimed:
1. A method of absorbing a selected gas component from a gas stream comprising the steps of: bringing the gas stream into contact with a liquid including a solvent or a reagent for the selected gas component in a turbulent contactor, the contactor including a gas inlet, a liquid inlet, an outlet leading to a venturi passage and a tube extending from the outlet back upstream, wherein the tube is perforated, the tube is spaced from the periphery of the outlet or the tube is both perforated and spaced from the periphery of the outlet; subjecting the gas stream and the liquid to turbulent mixing conditions in the contactor thereby causing the gas component to be absorbed by the solvent or reagent.

2. A method as claimed in claim 1, in which the method is carried out as a continuous process with the gas stream and liquid flowing co-currently.

3. A method as claimed in claim 1, further including the step of separating a gas phase and a liquid phase after the turbulent mixing.

4. A method as claimed in claim 3, further including the step of treating the liquid phase to remove the absorbed gas component.

5. A method as claimed in claim 1, in which the tube is located in a vessel, the vessel including the gas inlet, the liquid inlet and the outlet.

6. A method as claimed in claim 5, in which the gas stream is supplied to the tube and the liquid is supplied to the vessel, whereby the gas stream draws the liquid into the venturi and the two phases are mixed.

7. A method as claimed in claim 5, in which the gas stream is supplied to the vessel and the liquid is supplied to the tube, whereby the gas stream is drawn into the venturi by the liquid and the two phases are mixed.

8. A method as claimed in claim 5, in which the liquid and the gas stream are supplied to the vessel, the liquid being supplied to a level above of the outlet, whereby gas stream is forced out through the outlet via the tube, thereby drawing the liquid into the venturi so that the two phases are mixed.

9. A method as claimed in claim 1, in which the selected gas component to be absorbed comprises substantially the entirety of the gas stream.

10. A method as claimed in claim 1, in which the gas stream is a gas mixture from which a single component is removed.

11. A method as claimed in claim 1, in which the gas stream is a gas mixture from which a plurality of gas components are removed, either by a common solvent or reagent, or by respective solvents or reagents.

12. A method as claimed in claim 1, in which the gas stream and the liquid are formed into a homogeneous mixture in the contactor, the homogeneous mixture being cooled prior to separation into a gas phase and liquid phase.

13. A method as claimed in claim 12, in which the cooled homogeneous mixture is separated into a gas and a liquid phase in hydrocyclone.

14. A method as claimed in claim 13, in which the solvent or reagent in the liquid phase is subjected to a regeneration treatment to remove the absorbed selected gas component.

15. A method as claimed in claim 14, in which the regenerated solvent-containing liquid phase is recycled to the contactor.

16. A method as claimed in claim 15, in which the regeneration is carried out by heating, by flashing off the absorbed gas component in a flash tank or by both heating and flashing off the absorbed gas component in a flash tank.

17. A method as claimed in claim 16, in which the post-mixing cooling and the regenerative heating are achieved, at least in part by mutual heat exchange.

18. A method of use of a turbulent contactor including the steps of providing a gas inlet, a liquid inlet, an outlet leading to a venturi passage and a tube extending from the outlet back upstream, the tube being perforated, the tube being spaced from the periphery of the outlet, or the tube being both perforated and spaced from the periphery of the outlet for absorbing a selected gas component from a gas stream by bringing the gas stream into contact with a liquid including a solvent or a reagent for the selected gas component, thereby causing the gas component to be absorbed by the solvent or reagent.

19. The method as claimed in claim 18, in which the tube is located in a vessel, the vessel including the gas inlet, the liquid inlet and the outlet.

\* \* \* \* \*